United States Patent [19]

Teraoka

[11] Patent Number: 5,580,326

[45] Date of Patent: Dec. 3, 1996

[54] DIFFERENTIAL GEAR ASSEMBLY

[75] Inventor: Masao Teraoka, Tochigi-ken, Japan

[73] Assignee: Tochigi Fuji Sangyo Kabushiki Kaisha, Japan

[21] Appl. No.: 465,951

[22] Filed: Jun. 6, 1995

Related U.S. Application Data

[63] Continuation-in-part of Ser. No. 38,923, Mar. 29, 1993, Pat. No. 5,458,546.

[30] Foreign Application Priority Data

Mar. 31, 1992 [JP] Japan ................................. 4-105479
Mar. 31, 1992 [JP] Japan ................................. 4-105879

[51] Int. Cl.[6] ........................................ F16H 48/06
[52] U.S. Cl. ............................... 475/248; 475/252
[58] Field of Search ............................ 475/248, 252

[56] References Cited

U.S. PATENT DOCUMENTS

| | | | |
|---|---|---|---|
| 2,269,734 | 1/1942 | Powell | 475/252 |
| 3,251,244 | 5/1966 | Nickell | 475/252 |
| 3,528,323 | 9/1970 | Kamlukin | 475/252 |
| 3,706,239 | 12/1972 | Meyers . | |
| 3,768,336 | 10/1973 | Wharton | 475/252 |
| 5,122,101 | 6/1992 | Tseng . | |
| 5,194,058 | 5/1993 | Amborn et al. | 475/252 |
| 5,269,732 | 12/1993 | Weiss et al. | 475/252 |
| 5,282,775 | 2/1994 | Teraoka | 475/252 |
| 5,458,546 | 10/1995 | Teraoka | 475/248 |

FOREIGN PATENT DOCUMENTS

| | | |
|---|---|---|
| 1086136 | 1/1961 | Germany . |
| 4013202A1 | 10/1991 | Germany . |
| 4017800A1 | 12/1991 | Germany . |
| 4137931A1 | 5/1992 | Germany . |
| 97346 | 6/1984 | Japan . |

Primary Examiner—John T. Kwon
Attorney, Agent, or Firm—Graham & James LLP

[57] ABSTRACT

Disclosed is a differential gear assembly having: a rotatable case; first and second side gears being coaxially supported in the case and connected to first and second output shafts, respectively; at least one pair of first and second pinion gears, the first pinion gear having first and second gear portions, the second pinion gear having third and fourth gear portions, the first and second pinion gears being arranged in parallel to the rotation axis of the case so that the first gear portion is engaged with the third gear portion, the second gear portion is engaged with the first side gear, and that the fourth gear portion is engaged with the second side gear; and a holding member being provided on the case for holding the first and second pinion gears. The first and second pinion gears move with the case around the rotation axis in response to rotation of the case and each of the first and second pinion gears is slidable and rotatable around an axis thereof with respect to the holding member. The first and third gear portions move around the rotation axis within a first cylindrical scope which is located at one of axially outer sides of a second cylindrical scope containing the first and second side gears.

16 Claims, 15 Drawing Sheets

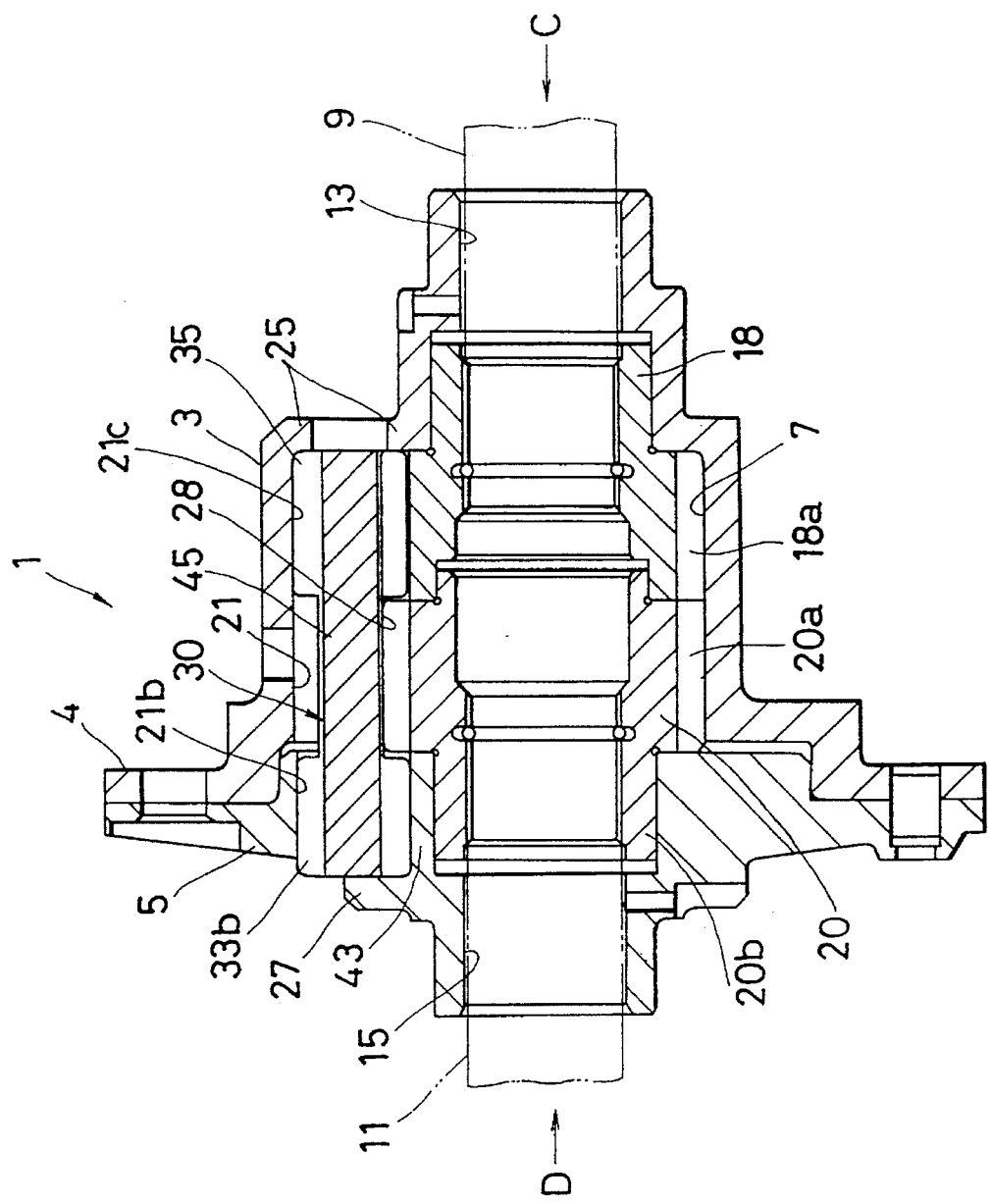

DIFFERENTIAL GEAR ASSEMBLY

BACKGROUND OF THE INVENTION

This application is a continuation in part application from U.S. patent application No. 08/038,923 filed on Mar. 29, 1993, now U.S. Pat. No. 5,458,546.

FIELD OF THE INVENTION

The present invention relates to a differential gear assembly for use in a vehicle or the like.

DESCRIPTION OF THE PRIOR ART

Generally, a differential gear assembly used in a vehicle is prepared for occurrence of slipping or skidding of one tire so as to provide a sufficient rotation force to the other tire which is not slipped. For example, such a differential gear assembly is disclosed in Japanese Laid-Open Patent Publication No. (Kokai) 97346/1984.

The differential gear assembly disclosed in the above-referenced publication comprises a case having a cylindrical bore. The bore is provided at its circumference with a plurality of receptacle grooves which are arranged in pairs and extend along an axial direction of the bore. Each of the receptacle grooves has a cylindrical inner wall. Within the bore, left and right side gears are rotatably arranged and coupled to left and right torque shafts, respectively. The receptacle grooves in each pair receive first and second pinion gears in such a manner that the first and the second pinion gears are rotatable and extend in parallel to the left and the right side gears. The first pinion gear comprises first and second gear portions while the second pinion gear comprises third and fourth gear portions. The left side gear is engaged with a part of the first gear portion of the first pinion gear while the right side gear is engaged with a part of the fourth gear portion of the second pinion gear. The other part of the first gear portion of the first pinion gear is engaged with the third gear portion of the second pinion gear while the other part of the fourth gear portion of the second pinion gear is engaged with the second gear portion of the first pinion gear.

A pair of flat side plates are arranged axially outwardly of the first and the second pinion gears to define axial positions of the pinion gears. The flat side plates cover the opposite end faces of the differential gear assembly.

The above-mentioned differential gear assembly is designed so that friction is caused between the pinion gears and the receptacle grooves when the first and the second pinion gears are rotated within the receptacle grooves and that the pinion gears are engaged with each other. Accordingly, when the vehicle is turned with both tires kept in tight contact with the ground, differential operation enables differential rotation dependent upon a difference in rotation speed between the both tires. On the other hand, when one tire is slipped, the differential operation is restricted or limited by the friction caused in the receptacle grooves. It is therefore possible to prevent the loss of the rotational force transmitted to the other tire which is not slipped. Thus, an excellent road ability can be assured even in a rough road.

However, the receptacle grooves receiving gear portions of the first and the second pinion gears do not support the entire periphery of the gear portions. In this connection, each pinion gear tends to be dislocated towards the other pinion gear or towards the side gear. Accordingly, proper engagement between the pinion gears could not always be maintained. This results in insufficiency in durability and quietness. It is noted that restriction of the differential operation is related to the friction between the receptacle grooves and the pinion gears. Accordingly, it is necessary to provide a sufficient contact area between the pinion gears and the receptacle grooves. This results in an increase of the axial length, in combination with the instability in positions of the center axes of the pinion gears.

SUMMARY OF THE INVENTION

In order to solve the above-mentioned problems, it is an object of the present invention to provide a differential gear assembly which assures proper support of pinion gears and which can improve the durability and the quietness of the pinion gears.

It is another object of the present invention to provide a differential gear assembly which can be reduced in axial length.

In order to accomplish the above-mentioned object, a differential gear assembly according to the present invention comprises: a case rotatable around a rotation axis in response to a driving force supplied from a power source; first and second side gears being coaxially supported in said case in such a manner that said first and second side gears are individually rotatable around said rotation axis of the case with respect to said case, said first and second side gears being adapted to be connected to first and second output shafts, respectively; at least one pair of first and second pinion gears, said first pinion gear having first and second gear portions, said second pinion gear having third and fourth gear portions, the first and second pinion gears being arranged in parallel to said rotation axis so that said first gear portion is engaged with said third gear portion, said second gear portion is engaged with said first side gear, and that said fourth gear portion is engaged with said second side gear; and a holding member being provided on said case for holding said first and second pinion gears in such a manner that the first and second pinion gears move with the case around the rotation axis in response to rotation of the case and each of the first and second pinion gears is slidably rotatable around an axis thereof with respect to the holding member, wherein said first and third gear portions move around the rotation axis within a first cylindrical scope which is located at one of axially outer sides of a second cylindrical scope containing said first and second side gears.

According to the above construction, the axial length of the differential gear assembly can be reduced, while simple manufacturing process and stability of the pinion gears are achieved.

In the above construction, the first and the second pinion gears are supported by a holding bore formed on the end of the case. Accordingly, it is made possible to assure proper support of the pinion gears.

In addition, engagement between the first and the second pinion gears is established within the receptacle grooves which are formed at the end of the case and which circumscribe the entire circumference of the gear portions. Accordingly, engagement between the pinion gears can be maintained in an excellent condition and the case can be reduced in size along the rotation axis.

BRIEF DESCRIPTION OF THE DRAWINGS

The features and advantages of the differential gear assembly according to the present invention will be more clearly understood from the following description of the preferred embodiments of the present invention taken in conjuntion with the accompanying drawings, in which like reference numerals designate the same or similar elements or sections throughout the figures thereof and in which:

FIG. 4 is a view for describing engagement between side gears and pinion gears.

FIG. 5 is a front sectional view showing a second embodiment of the differential gear assembly according to the present invention;

DETAILED DESCRIPTION OF THE INVENTION

Figure 1:
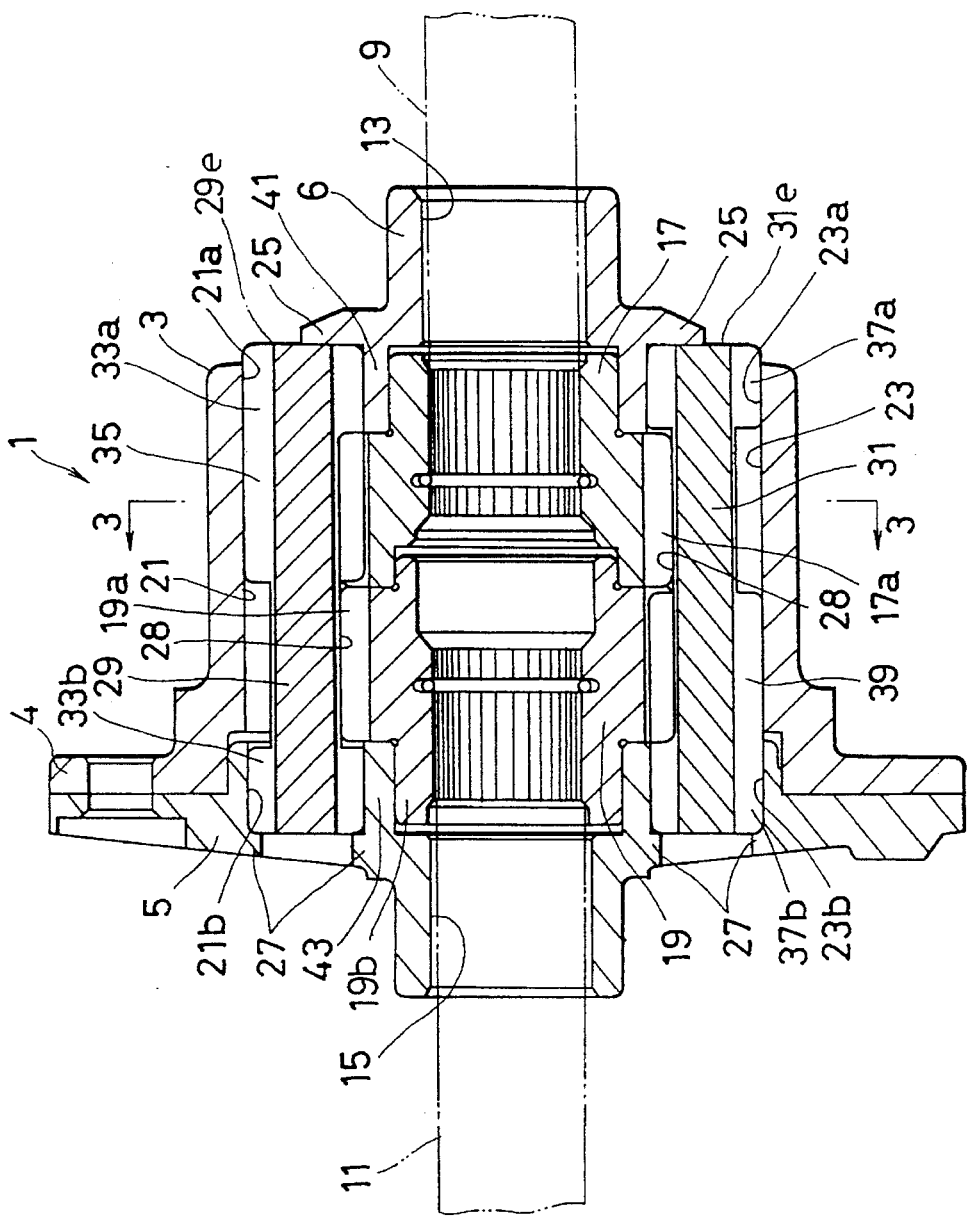
FIG. 1 is a front sectional view showing a first embodiment of a differential gear assembly according to the present invention.

Description will now be made as regards a first embodiment of the present invention with reference to the drawing.

Figure 2:
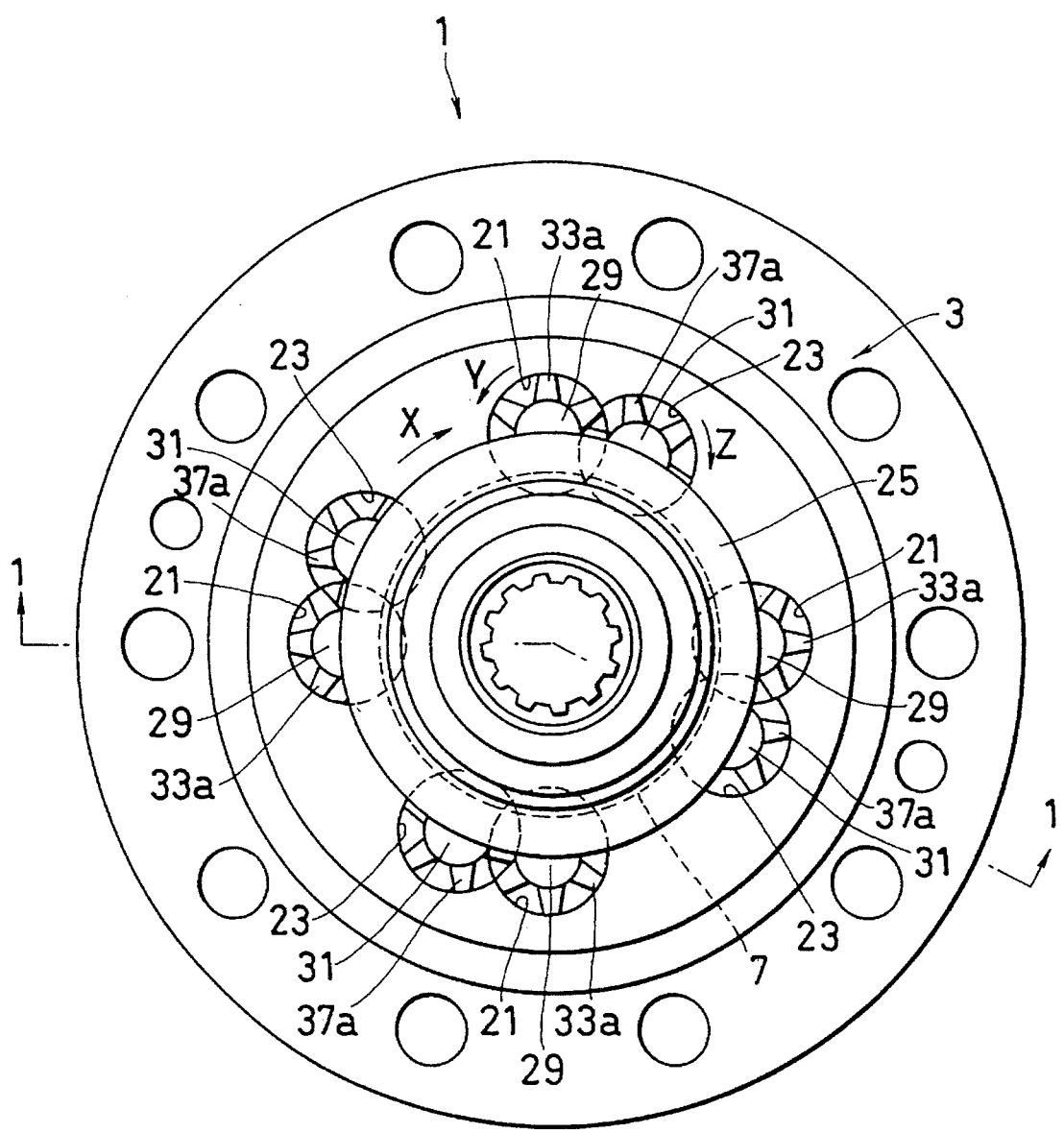
FIG. 2 is a side view of the differential gear assembly illustrated in FIG. 1.
Figure 3:
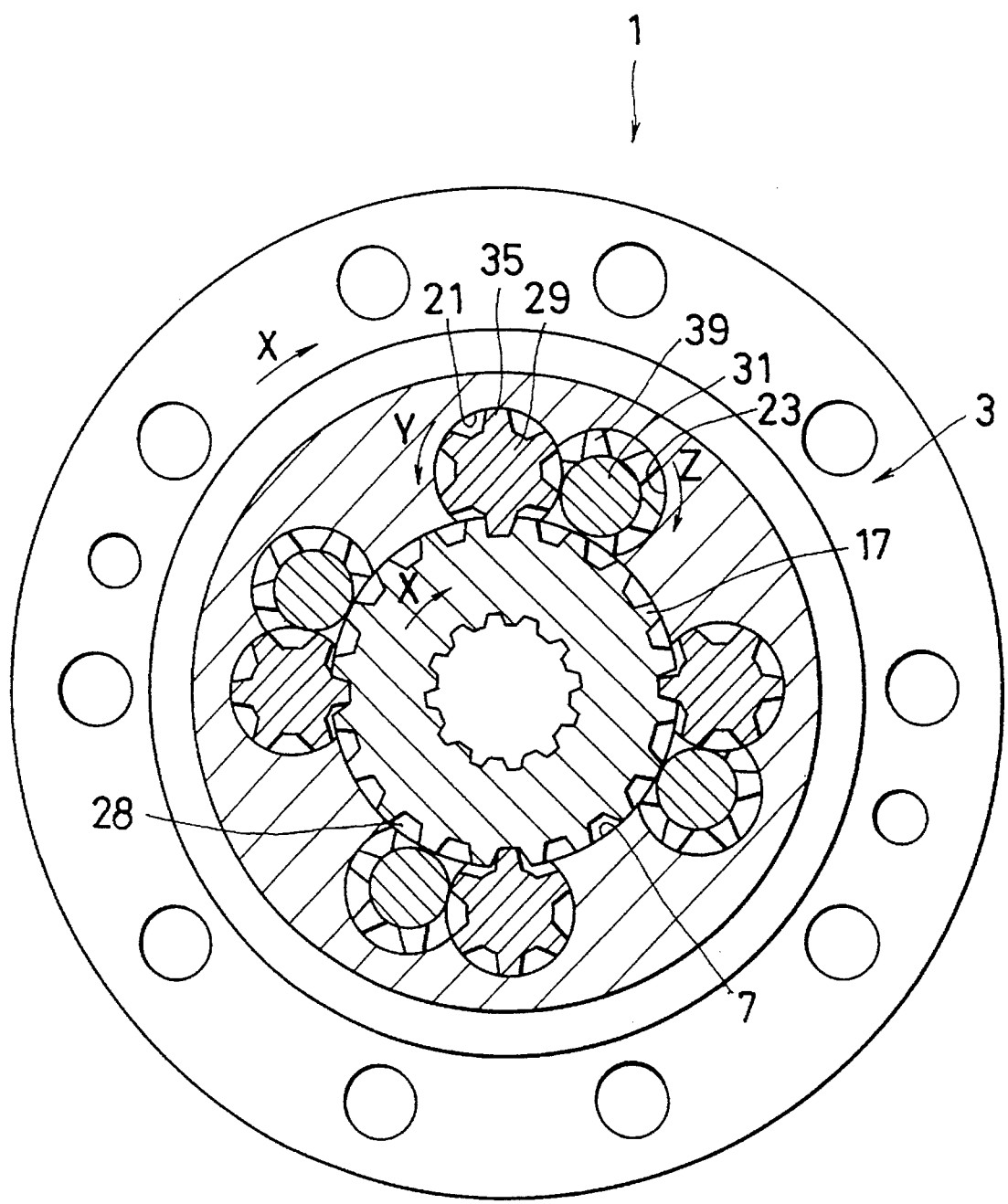
FIG. 3 is a sectional view of the differential gear assembly taken along a line 3—3 in FIG. 1.

FIG. 1 is a front sectional view of the first embodiment of the differential gear assembly according to the present invention and corresponds to a sectional view taken along a line 1—1 In FIG. 2. FIG. 2 is a side view of the differential gear assembly illustrated in FIG. 1. FIG. 3 is a sectional view of the differential gear assembly taken along a line 3—3 in FIG. 1. The structure of the differential gear assembly will presently be described.

The differential gear assembly comprises a case 1 which includes a cylindrical case body 3 and a cover 5. The case 1 is supported on a body of a vehicle through bearings (not shown). On the outer periphery of the case 1 provided is a flange portion 4 to which a gear (not shown) is attached. The gear is supplied with a rotational force from an engine (not shown) mounted on the vehicle through a power transmission device. Thus, the case 1 is adapted to rotate around a longitudinal rotation axis when driven by the engine.

The case body 3 has a shaft bearing 6 coaxially arranged opposite to the cover 5 of the case 1 in the axial direction. A cylindrical chamber 7 is formed in the interior of the case 1. The shaft bearing 6 and the cover 5 are provided at their centers with a first axial hole 13 and a second axial hole 15, respectively. A first shaft 9 is inserted through the first axial hole 13 into the case 1, while a second shaft 11 is inserted through the second axial hole 15. The first and the second shafts 9 and 11 are coaxially arranged with respect to the rotation axis of the case 1 and rotatably supported by the first and the second axial holes 13 and 15, respectively. The first and the second shafts 9 and 11 can be rotated independently with respect to each other.

The first and the second shafts 9 and 11 are operatively coupled to right and left axles (not shown) of the vehicle, respectively.

The chamber 7 of the case 1 accommodates a first side gear 17 and a second side gear 19 which are aligned and adjacent to each other. The first side gear 17 is fixedly fitted to the first shaft 9 while the second side gear 19 is fixedly fitted to the second shaft 11. The first and the second side gears 17 and 19 are provided at their outer peripheries with helical gear portions 17a and 19a formed in a central area of the case 1. No helical gear portion is provided in peripheral areas around the axial holes.

As will be understood from FIG. 3, four pairs of first and second receptacle holes 21 and 23 are formed on the periphery of the chamber 7 extending through the case body 3 and the cover 5. The first and the second receptacle holes 21 and 23 are arranged in parallel to the rotation axis of the case 1 to penetrate through the case 1. A first pinion gear 29 and a second pinion gear 31 are inserted in the first and the second receptacle holes 21 and 23 in each pair, respectively.

The first pinion gear 29 has, at its opposite ends, first helical gear portions 33a and 33b. The first helical gear portion 33a formed at the opposite side to the cover 5, or, at the side of the first shaft 9, has a part inwardly extending towards the center of the first pinion gear 29 to form a second helical gear portion 35 in an integral fashion. Likewise, the second pinion gear 31 has, at its opposite ends, third helical gear portions 37a and 37b. The third helical gear portion 37b formed at the side of the cover 5, or, at the side of the second shaft 11, inwardly extends towards the center of the second pinion gear 31 to form a fourth helical gear portion 39 in an integral fashion. The first and the second pinion gears 29 and 31 and the first and the second side gears 17 and 19 are assembled so that their rotation axes are arranged in parallel to one another. Engagement is established between the first and the third helical gear portions 33a and 37a, between the first and the third helical gear portions 33b and 37b, between the second helical gear portion 35 and the helical gear portion 17a of the first side gear 17, and between the fourth helical gear portion 39 and the helical gear portion 19a of the second side gear 19. No engagement is provided between the first pinion gear 29 and the second side gear 19 and between the second pinion gear 31 and the first side gear 17.

As illustrated in FIG. 3, the receptacle holes 21 and 23 in each pair are formed in a shape of two small cylinders partially overlapping with each other and with the chamber 7 having a shape of a large cylinder. The inner round walls defining the receptacle holes 21 and 23 surround the outer peripheries of the first and the second pinion gears 29 and 31 engaged with each other. With this structure, an opening 28 is formed in an area where the receptacle holes 21 and 23 communicate with the chamber 7, in this area, engagement between the pinion gears and the side gears is established.

Each of the receptacle holes 21 and 23 are provided at its axial ends with stopper projections 25 and 27 radially projecting from the shaft bearing 6 and the cover 5, respectively. Thus, the first and the second pinion gears 29 and 31 are prevented from axial movement by presence of the stopper projections 25 and 27 which abut on flat end surfaces 29e, 31e formed on opposite ends of the pinion gears 29, 31.

The helical gear portions 33a and 35 of the first pinion gear 29 have outer peripheral surfaces which are brought into contact with the receptacle hole 21 to cause friction against the inner wall surface of the receptacle hole 21. Accordingly, when the first pinion gear 29 is subjected to the rotational force which is greater than the frictional force, the first pinion gear 29 is allowed to rotate around the center axis within the receptacle hole 21. The second pinion gear 31 and the receptacle hole 23 are arranged in the manner similar to the first pinion gear 29 and the receptacle hole 21.

In the above-mentioned structure, the first and the second side gears 17 and 19 are radially supported by a plurality of pairs of the first and the second pinion gears 29 and 31 arranged on the circumferences of the first and the second side gears 17 and 19. However, in the opening 28, the center axis of rotation of the pinion gear could possibly be dislocated towards the chamber or towards the other pinion gear. In order to inhibit such dislocation, the shaft bearing 6 and the cover 5 are provided with support portions 41 and 43 which project in parallel to the rotation axis to close a part of the opening 28, respectively.

In this embodiment, the support portions 41 and 43 are integrally formed on the cover 5 with the walls defining the receptacle hole parts 21a and 23a for receiving the first and the third gear portions 33a and 37a and with the walls defining the receptacle hole parts 21b and 23b for receiving the first and the third gear portions 33b and 37b, respectively. Specifically, at the side of the first shaft 9, two overlapping cylindrical bores for holding the first and second gear portions 33a and 37a are formed, as the receptacle hole parts 21a and 23a, in the side wall region which connects the outer periphery of the case 3 and the shaft bearing 6. Likewise, at the side of the second shaft 11, two overlapping cylindrical bores are formed, as the receptacle hole parts 21b and 23b, in the region projecting from the cover 5 in parallel to the rotation axis.

The support portions 41 and 43 of the above-mentioned structure have support surfaces each of which forms a part of the round outline surcimscribing the two overlapping cylinders. The support surfaces close the opening 28 at the receptacle hole parts 21a, 21b, 23a, and 23b which receive the gear portions 33a, 33b, 37a, and 37b. Thus, the outer periphery of the first and the third gear portions of the first and the second pinion gears 29 and 31 in engagement is completely surrounded by the support surfaces and the inner wall surfaces of the receptacle holes 21 and 23. In this event, the support portions 41 and 43 support the first gear portions 33a and 33b of the first pinion gear 29 and the third gear portions 37a and 37b of the second pinion gear 31 radially outwardly from the center side of the case 1. Thus, radial displacement of the center axes of the pinion gears is restricted. Accordingly, the pinion gears are held by the inner walls of the receptacle holes and the support portions so that the center axes are properly positioned.

Description will now proceed to the operation of the differential gear assembly of the above-mentioned structure.

The case 1 is driven by the engine through the power transmission device and rotates in a direction depicted by an arrow X in FIG. 3. The first and the second pinion gears 29 and 31 are subjected to a force along the direction X from the receptacle holes 21 and 23 of the case 1. At this time, the force along the direction X is transmitted by the friction between the pinion gears 29 and 31 and the receptacle holes 21 and 23 and by the engagement between the first and the second side gears 17 and 19 and the pinion gears 29 and 31. Accordingly, the first and the second side gears 17 and 19 and the first and the second shafts 9 and 11 are rotated in the direction X.

As a result, during the straightforward movement of the vehicle, the first and the second side gears 17 and 19 perform no relative movement. Likewise, the first and the second pinion gears 29 and 31 perform no relative movement.

During the turning movement of the vehicle, the left and the right wheels are rotated at different rotation speeds. In this connection, the first side gear 17 tries to perform relative rotation with respect to the second side gear 19. Referring to FIGS. 2 and 3, it is assumed that the first side gear 17 tries to rotate faster than the case 1 in the direction X. In this event, the first pinion gear 29 tries to rotate within the receptacle hole 21 in a direction Y against the friction between the first pinion gear 29 and the receptacle hole 21. Accordingly, the second pinion gear 31 engaged with the first pinion gear 29 is rotated in a direction Z within the receptacle hole 23. As a result, the second side gear 19 engaged with the second pinion gear 31 is rotated with respect to the case 1 along a direction reverse to the direction X. Thus, the first side gear 17 is allowed to rotate faster than the second side gear 19. This facilitates the turning movement of the vehicle.

On occurrence of slipping of one wheel, the operational relationship between the first and the second side gears 17 and 19 is similar, at the initial stage, to that during the turning movement of the vehicle. For example, it is assumed that the frictional force between a road surface and one tire corresponding to the first side gear 17 is smaller than that between the road surface and the other tire corresponding to the second side gear 19. In this event, the first side gear 17 tries to rotate faster than the case 1 in the direction X. The first pinion gear 29 engaged with the first side gear 17 also tries to rotate in the direction X.

However, in case of slipping, relative rotation (differential rotation) of the first side gear 17 can be restricted by the friction between the first and the second pinion gears 29 and 31 and the receptacle holes 21 and 23 and by the mutual pressing force between the gear teeth in engagement. When the movement of the pinion gear 29 engaged with the first side gear 17 is suppressed by the case 1 which moves slower than the pinion gear 29, the pinion gears are rotated in frictional contact with the receptacle holes. The pinion gears are pressed against each other in the engaged state. Accordingly, rotation of the second side gear 19 in a direction reverse to the direction X is restricted also. Thus, when the load applied on one of the side gears is decreased, the driving force transmitted to the non-slipped tire along the direction X is maintained by such a degree that the relative rotation of the first side gear 17 is restricted by the friction and the engagement of the gears. It is therefore possible to run the vehicle by the traction force of the non-slipped tire. As a result, the vehicle can be readily recovered from the slippage of one wheel into a normal state.

The frictional force produced between the pinion gears 29, 31 and the receptacle holes 21, 23 depends on the pressure which pushes the pinion gears 29, 31 against the receptacle holes 21, 23. This pressure applied to the pinion gears 29, 31 is in proportion to magnitude of the input torque. Therefore, magnitude of the force which restricts differential rotation of the first and second side gears 18, 20 changes in accordance with the input torque.

In the above-described embodiment, the first and the second pinion gears 29 and 31 are supported at their ends by the support portions 41 and 43 formed on the opposite side walls of the case 1 and the receptacle holes 21*a*, 21*b*, 23*a*, and 23*b* in such a manner that the entire periphery of the first and the second pinion gears 29 and 31 is surrounded. Accordingly, the center axes of the first and the second pinion gears 29 and 31 are always maintained in parallel to the center axes of the first and the second side gears 17 and 19.

The power transmission between each pair of the first and the second pinion gears 29 and 31 is carried out at two positions adjacent to the opposite ends of the first and the second pinion gears 29 and 31. Accordingly, the pinion gears keep a good balance to thereby assure that the first and the second pinion gears 29 and 31 are supported in place. Accordingly, the gear engagement is excellent and no pinion shaft is required to fix the center axis.

The first and the second pinion gears 29 and 31 are engaged with each other in the receptacle hole parts 21*a*, 21*b*, 23*a*, and 23*b* formed on the side walls at the opposite ends of the case 1. Accordingly, the engagement between the pinion gears 29 and 31 are accurately maintained to thereby improve the durability and the quietness of the pinion gears 29 and 31. Furthermore, the pinion gears are supported by the support surfaces of the shaft bearing and the cover. This increases the area of the frictional surfaces of the pinion gears and, therefore, the differential limiting force is increased. It is thus possible to reduce the axial lengths of the pinion gears. This effect is further developed by the stability of the center axes as described in the foregoing and contributes to reduction of the length of the case 1 along the rotation axis as well as reduction of size and weight of the differential gear assembly.

Next, description proceeds to a second embodiment of the present invention.

Figure 4A:
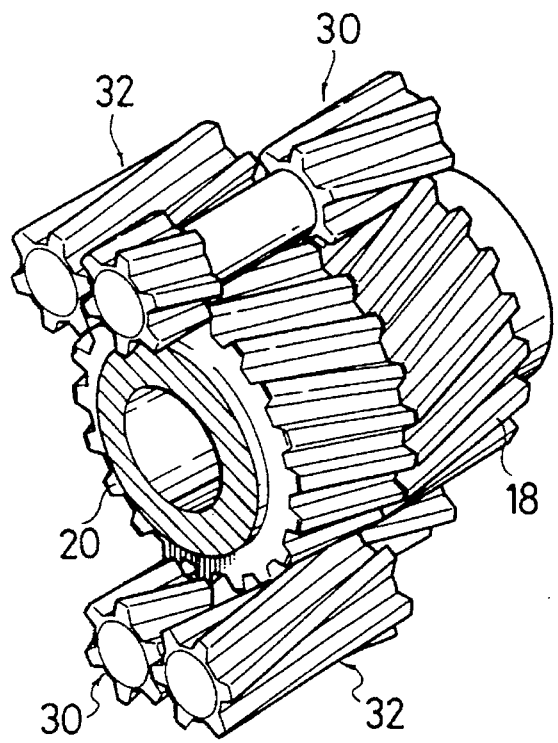
FIG. 4(a) shows the gears of the second embodiment shown in FIGS. 5 to 8 and of the third embodiment shown in FIGS. 9 to 15.
Figure 4B:
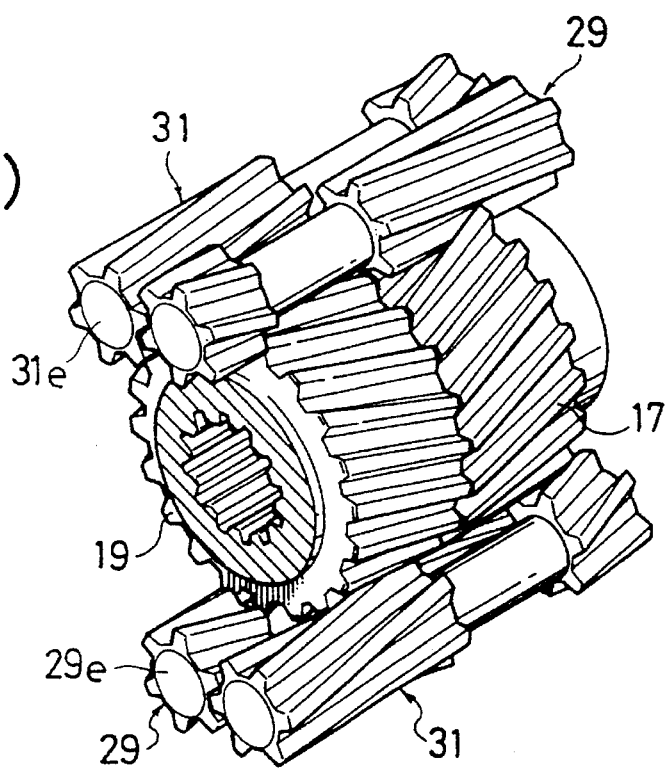
FIG. 4(b) shows the gears of the first embodiment shown in FIGS. 1 to 3.
Figure 6:
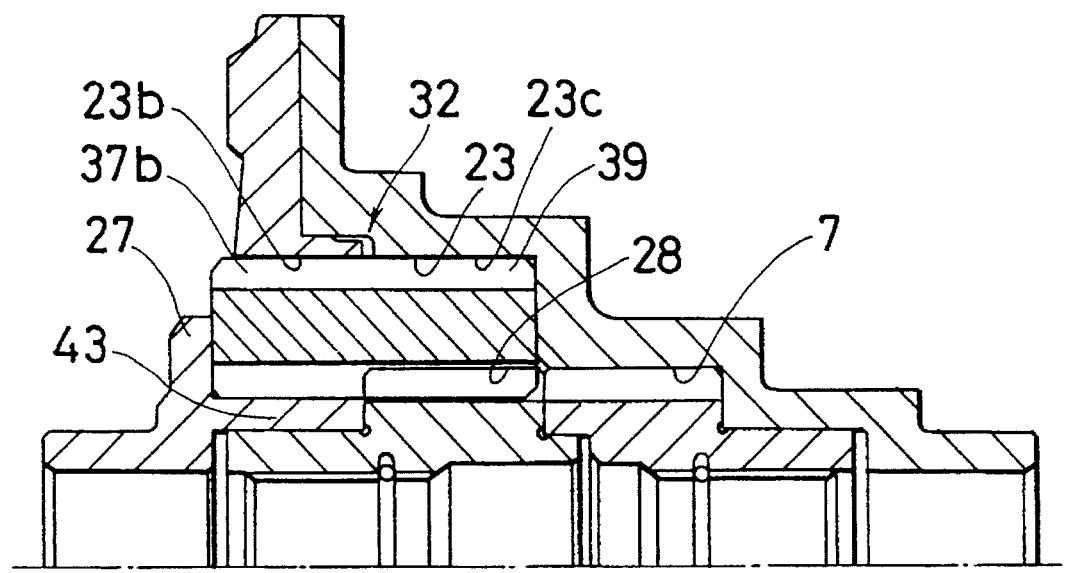
FIG. 6 is another front sectional view of the differential gear assembly illustrated in FIG. 5.
Figure 7:
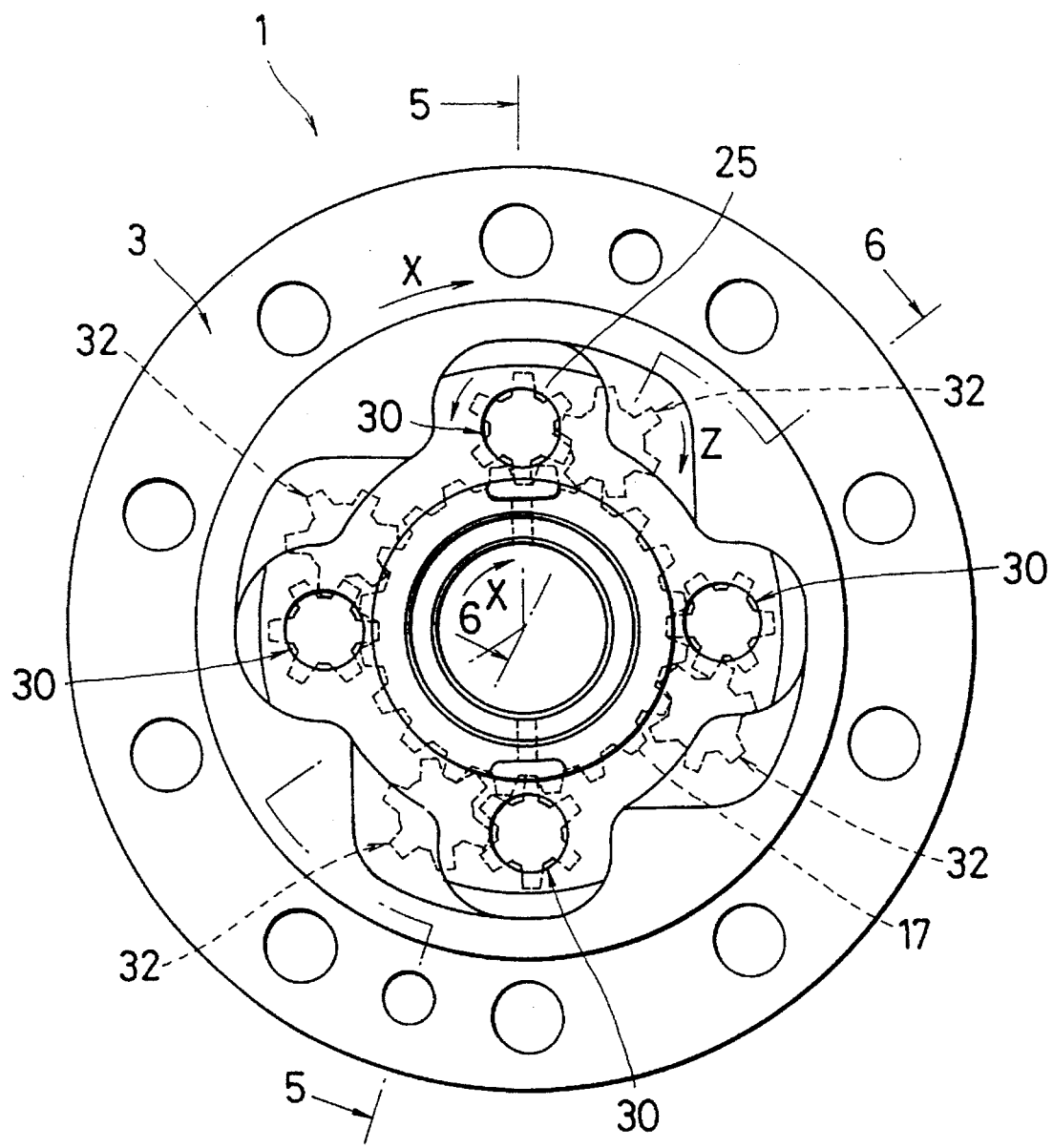
FIG. 7 is a side view of the differential gear assembly illustrated in FIG. 5 when viewed along a direction C.
Figure 8:
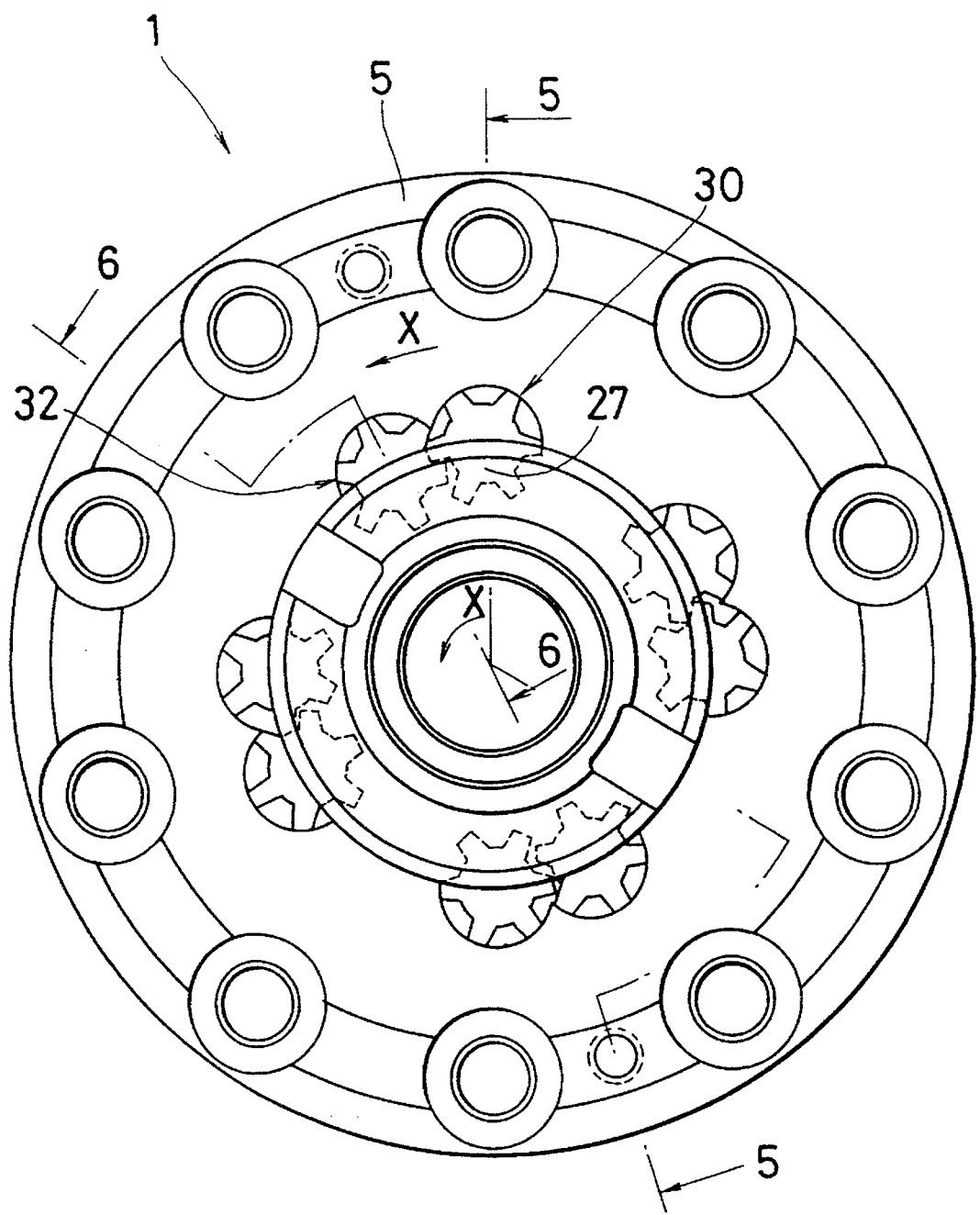
FIG. 8 is a side view of the differential gear assembly illustrated in FIG. 5 when viewed along a direction D.

FIGS. 4(*a*) and (*b*) are views for describing engagement of the gears. FIG. 5 is a front sectional view of a differential gear assembly according to the second embodiment and corresponds to a sectional view taken along a line 5—5 in FIGS. 7 and 8, and FIG. 6 is another front sectional view of the differential gear assembly illustrated in FIG. 5 and corresponds to a sectional view taken along a line 6—6 in FIGS. 7 and 8. FIG. 7 is a side view of the differential gear assembly illustrated in FIG. 5 when viewed along a direction C. FIG. 8 is a side view of the differential gear assembly illustrated in FIG. 5 when viewed along a direction D. The structure of the differential gear assembly will presently be described. In the following description, similar parts are designated by like reference numerals as those described in the first embodiment and will not be described any longer.

As will be understood from comparison with FIG. 4(*b*) which describes the engagement of the gears in the first embodiment, the first and the third gear portions 33 and 37 of the first and the second pinion gears are formed only at one ends thereof in the second embodiment illustrated in FIG. 4(*a*). in other words, the first and the third gear portions 33*a* and 37*a*, which are formed at the side of the first shaft in the first embodiment, are omitted here. Accordingly, the receptacle hole parts 21*a* and 23*a* are omitted also.

More specifically, the case body 3 and the cover 5 are provided with four pairs of the receptacle holes 21 and 23 formed along the periphery of the chamber 7. Axially outwardly of the receptacle holes 21 and 23, the stopper projections 25 and 27 project along a radial direction of the case 1 to abut the flat end surfaces of the first and second pinion gears 30, 32, in the receptacle holes 21 and 23, the walls defining the receptacle hole parts 21*b* and 23*b* and formed on the cover 5 are continuous to the support portion 43 and have the inner peripheral surfaces covering the entire periphery of the first and the third gear portions 33*b* and 37*b* of the pinion gear. The receptacle hole parts 21*c* and 23*c* formed on the case body 3 are provided with an opening 28 communicating with the chamber 7.

The first pinion gear 30 is provided at its end which is faced to the cover 5 with the first helical gear portion 33*b*. Likewise, the second helical gear portion 35 is formed at the end faced to the case body 3. The first and the second gear portions 33*b* and 35 are connected through an extension boss 45.

On the other hand, the second pinion gear 32 is provided with the third and the fourth helical gear portions 37*b* and 39 throughout the entire periphery. Since the third gear portion 37*a* and the boss for connection thereof are omitted, the entire length of the second pinion gear 32 is shorter than the first pinion gear 30 by the axial length of the gear portion 18*a* of the first side gear 18.

The first gear portion 33*b* of the first pinion gear 30 and the third gear portion 37*b* at one end of the second pinion gear 32 are engaged with each other and received in the receptacle hole parts 21*b* and 23*b* formed on the cover 5 without the opening 28.

The second gear portion 35 and the fourth gear portion 39 at the other end of the second pinion gear 32 project through the opening 28 of the case body 3 into the chamber 7. The second and the fourth gear portions 35 and 39 are engaged with the first and the second side gears 18 and 20, respectively. The first and the second side gears 18 and 20 are radially supported by a plurality of pairs of the first and the second pinion gears 30 and 32 arranged on the circumferences of the first and the second side gears 18 and 20.

The differential gear assembly according to the second embodiment also provides the differential operation similar to that described in conjunction with the first embodiment.

The first and the second pinion gears 30 and 32 are held in the receptacle hole parts 21*b* and 23*b* of the cover 5 so that the center axes are stably fixed. Accordingly, the first and the second pinion gears 30 and 32 are kept in correct engagement with each other. This results in improvement of the durability and the quietness of the first and the second pinion gears 30 and 32. By the reason similar to the first embodiment, the length of the case 1 along the rotation axis can be reduced to thereby achieve the differential gear assembly which is reduced in size and weight.

In the second embodiment, the first and third gear portions move around the rotation axis within a cylindrical scope which is located at only one of axially outer sides of another cylindrical scope containing said first and second side gears. In accordance with this, the first and the second pinion gears 30 and 32 is further reduced in length by omission of the first and the third helical gear portions 33*a* and 37*a*. Thus, this embodiment is particularly adapted to reduce the size and the weight of the differential gear assembly.

Now, description will be made as regards a third embodiment of the present invention.

Figure 9:
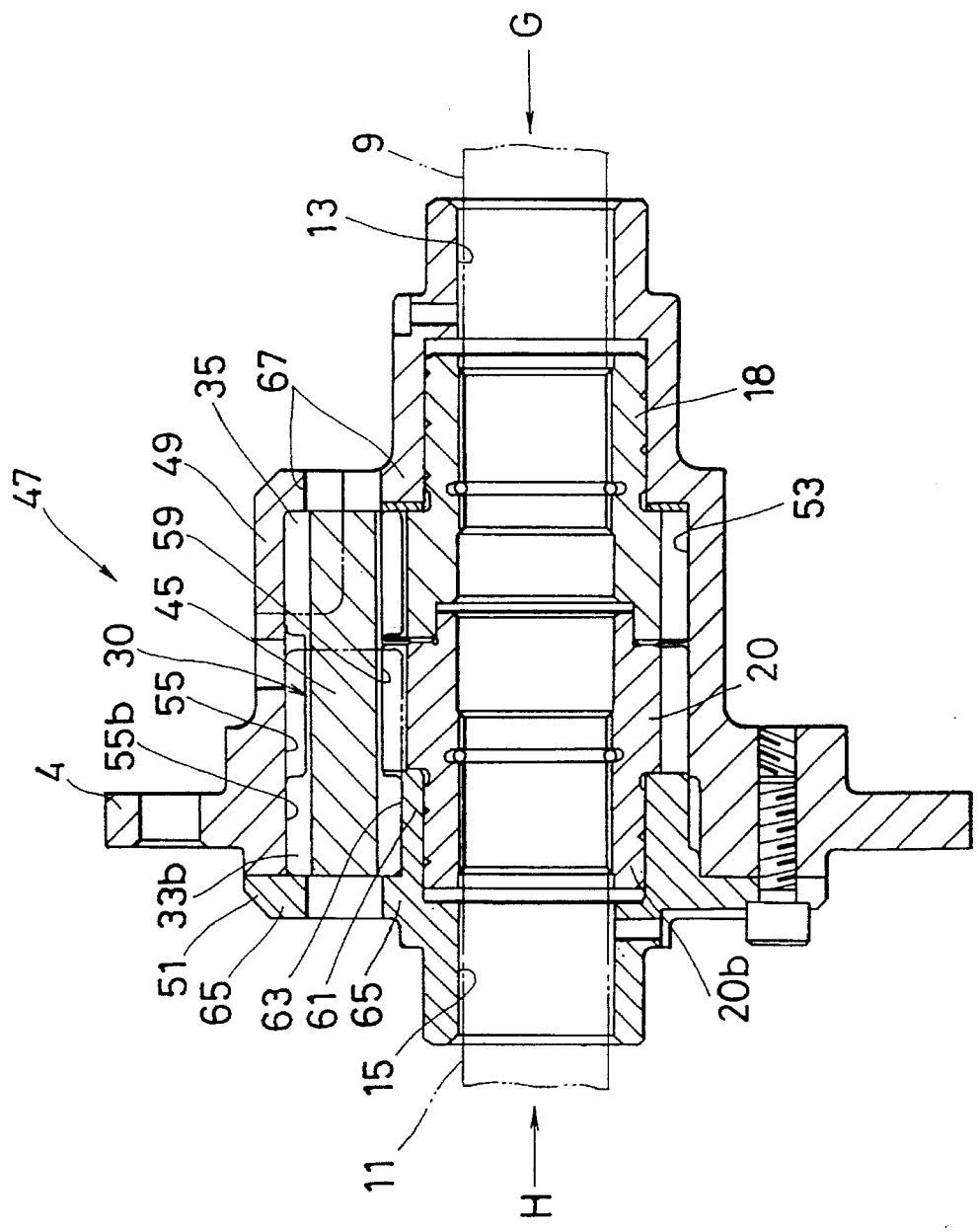
FIG. 9 is a front sectional view showing a third embodiment of the differential gear assembly according to the present invention.
Figure 10:
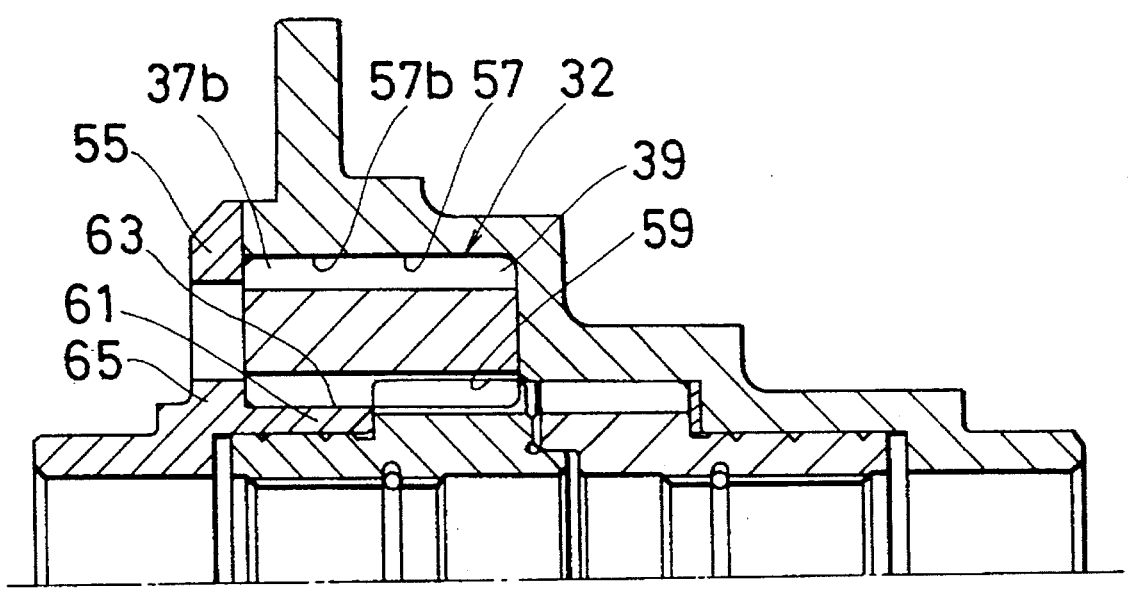
FIG. 10 is another front sectional view of the differential gear assembly illustrated in FIG. 9.
Figure 11:
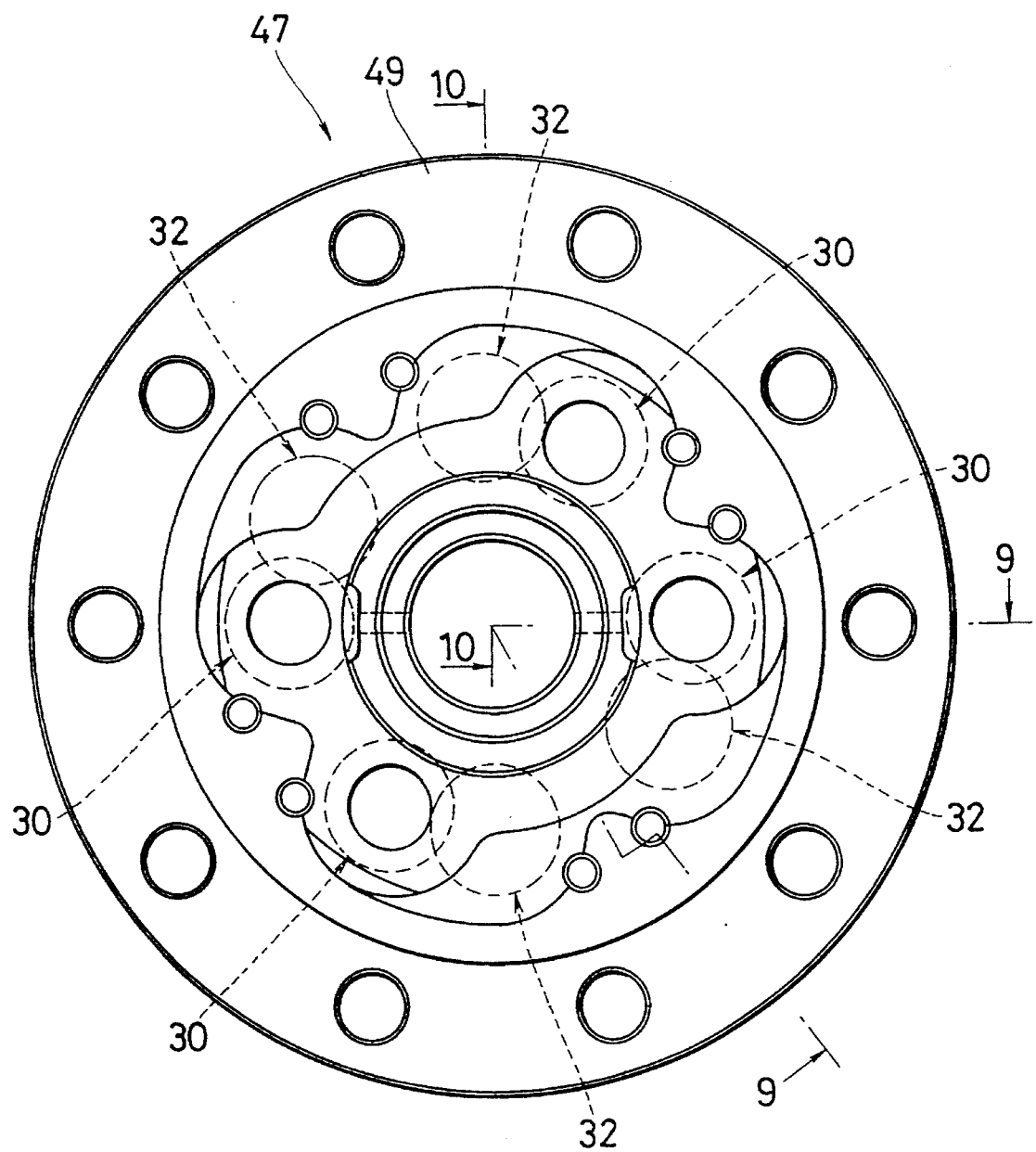
FIG. 11 is a side view of the differential gear assembly illustrated in FIG. 9 when viewed along a direction G.
Figure 12:
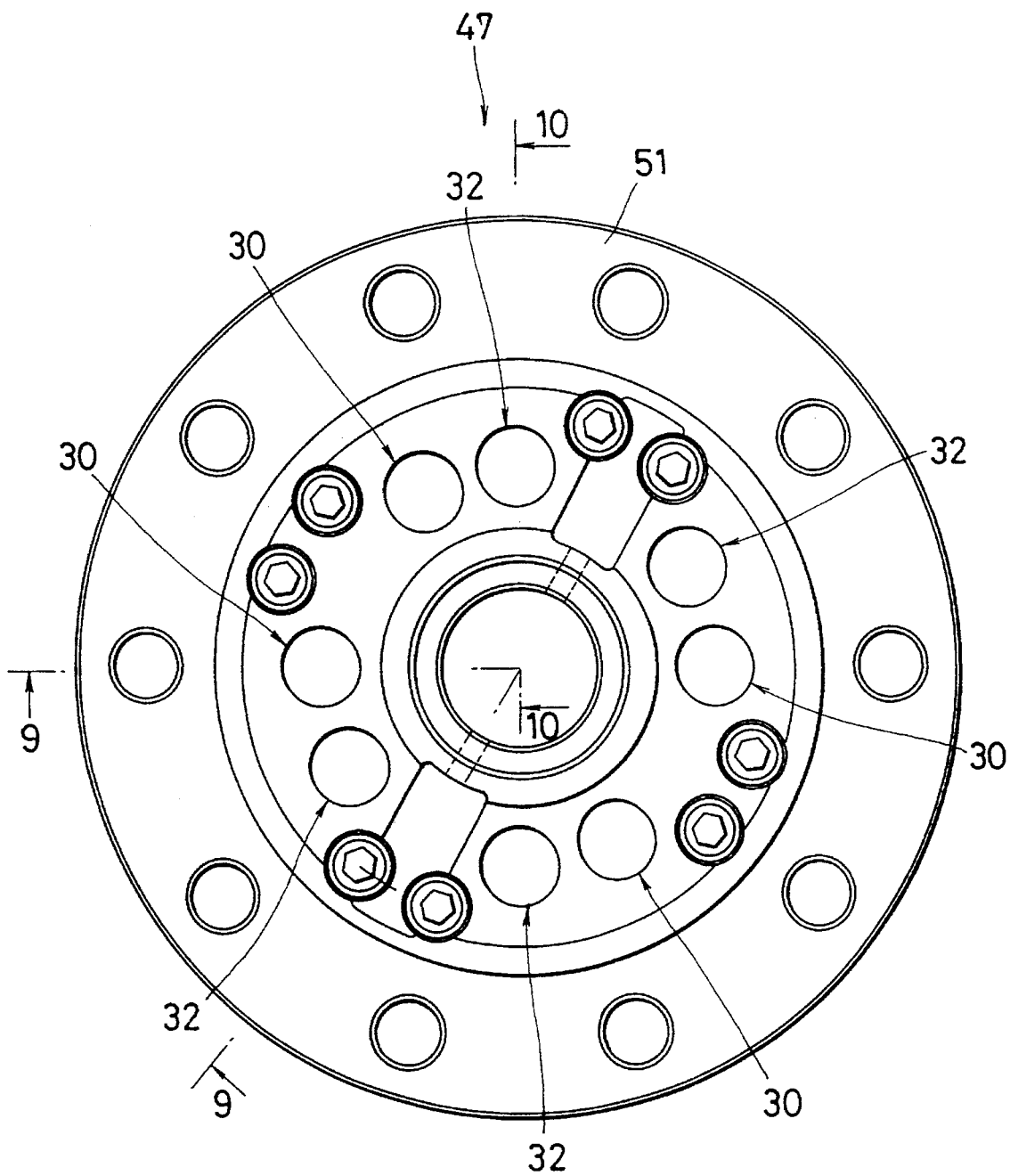
FIG. 12 is a side view of the differential gear assembly illustrated in FIG. 9 when viewed along a direction H.

FIG. 9 is a front sectional view of a differential gear assembly according to the third embodiment of the present invention and corresponds to a sectional view taken along a line 9—9 in FIGS. 11 and 12. FIG. 10 is another front sectional view of the differential gear assembly illustrated in FIG. 9 and corresponds to a sectional view taken along a line 10—10 in FIGS. 11 and 12. FIG. 11 is a side view of the differential gear assembly illustrated in FIG. 9 when viewed along the direction G. FIG. 12 is a side view of the differential gear assembly illustrated in FIG. 9 when viewed along the direction H. The structure of the differential gear assembly will presently be described. The similar parts as those described in the first and the second embodiments are designated by like reference numerals and will not be described any longer.

Referring to FIGS. 9, 10 and 11, a case 47 comprises a case body 49 and a cover 51. The first and the second shafts 9 and 11 are rotatably inserted into a chamber 53 in the case 47 through the first and the second axial holes 13 and 15, respectively. The first and the second side gears 18 and 20 are fitted on the peripheries of the first and the second shafts 9 and 11. The case body 49 is provided with four pairs of receptacle holes 55 and 57 symmetrically arranged at four positions along the outer periphery of the chamber 53. The receptacle holes 55 and 57 are provided with an opening 59 formed at the side of the rotation axis and opened towards the chamber 53.

Like the second embodiment, the first and the second pinion gears 30 and 32 are accommodated in the receptacle holes 55 and 57. The first and the second pinion gears 30 and 32 are prevented from movement by presence of stopper portions 65 and 67 which are radially formed at the axially outward sides of the receptacle holes 55 and 57.

The first pinion gear 30 is provided with the first helical gear portion 33b and the second gear portion 35. These gear portions 33b and 35 are connected through the extension boss 45. The second pinion gear 32 is provided with the gear portions 37b and 39 formed throughout its entire length and is shorter than the first pinion gear 30.

Like the first and the second embodiments, the second and the fourth gear portions 35 and 39 project into the chamber 53 through the opening 59 of the case body 49. The second and the fourth gear portions 35 and 39 are engaged with the first and the second side gears 18 and 20, respectively.

Figure 13:
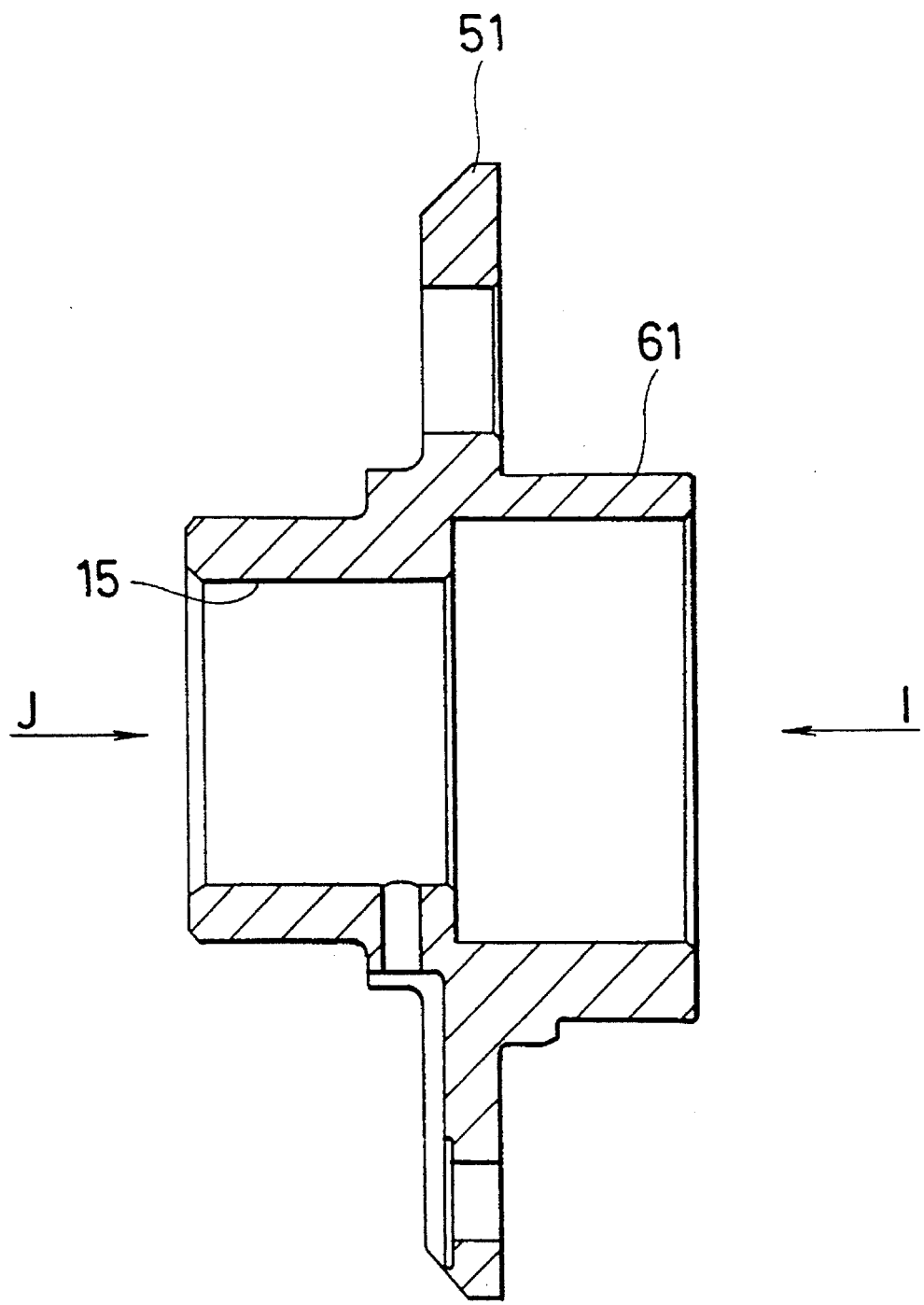
FIG. 13 is a sectional view of a cover illustrated in FIG. 9.
Figure 14:
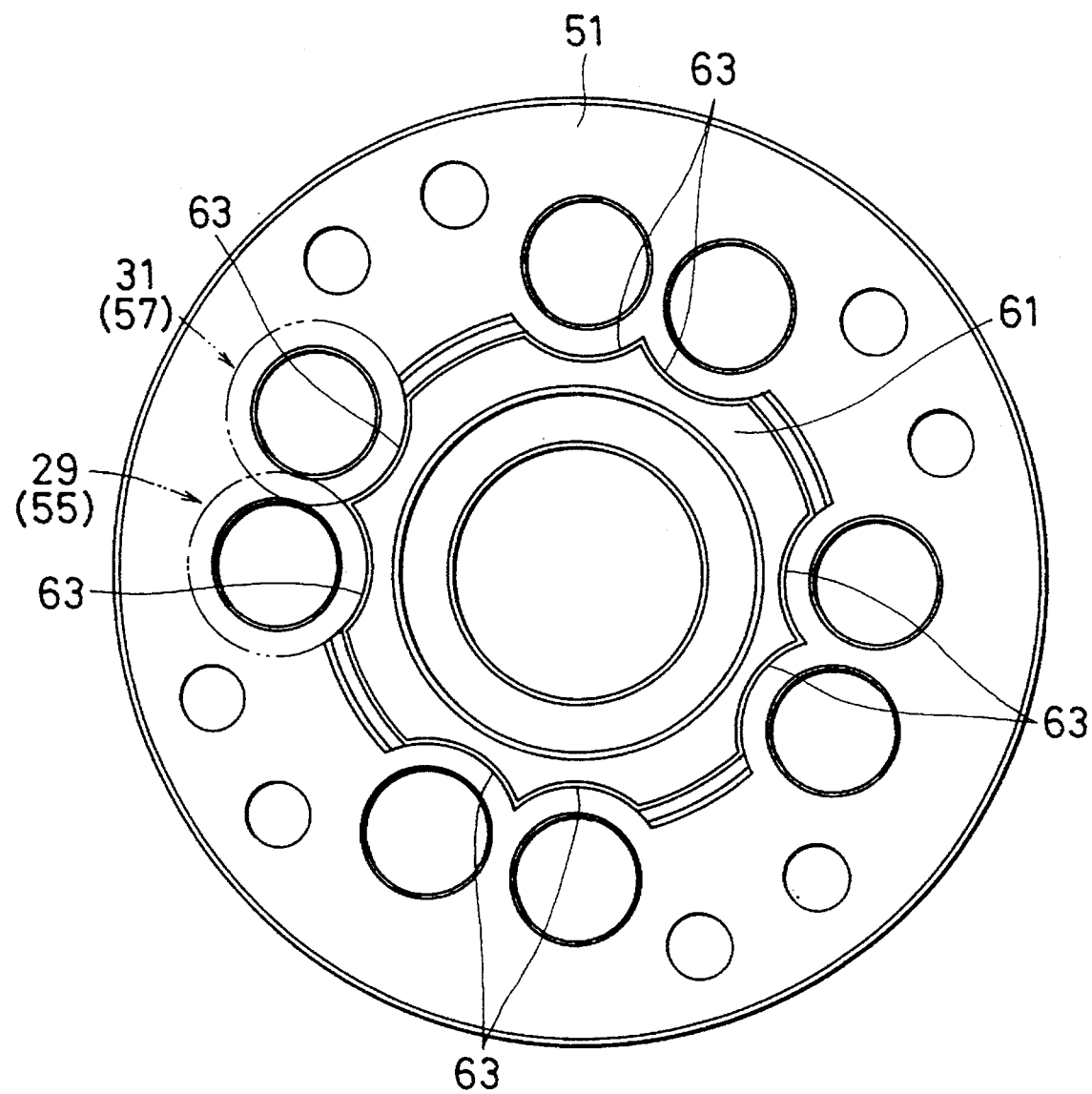
FIG. 14 is a side view of the cover illustrated in FIG. 13 when viewed along a direction I.
Figure 15:
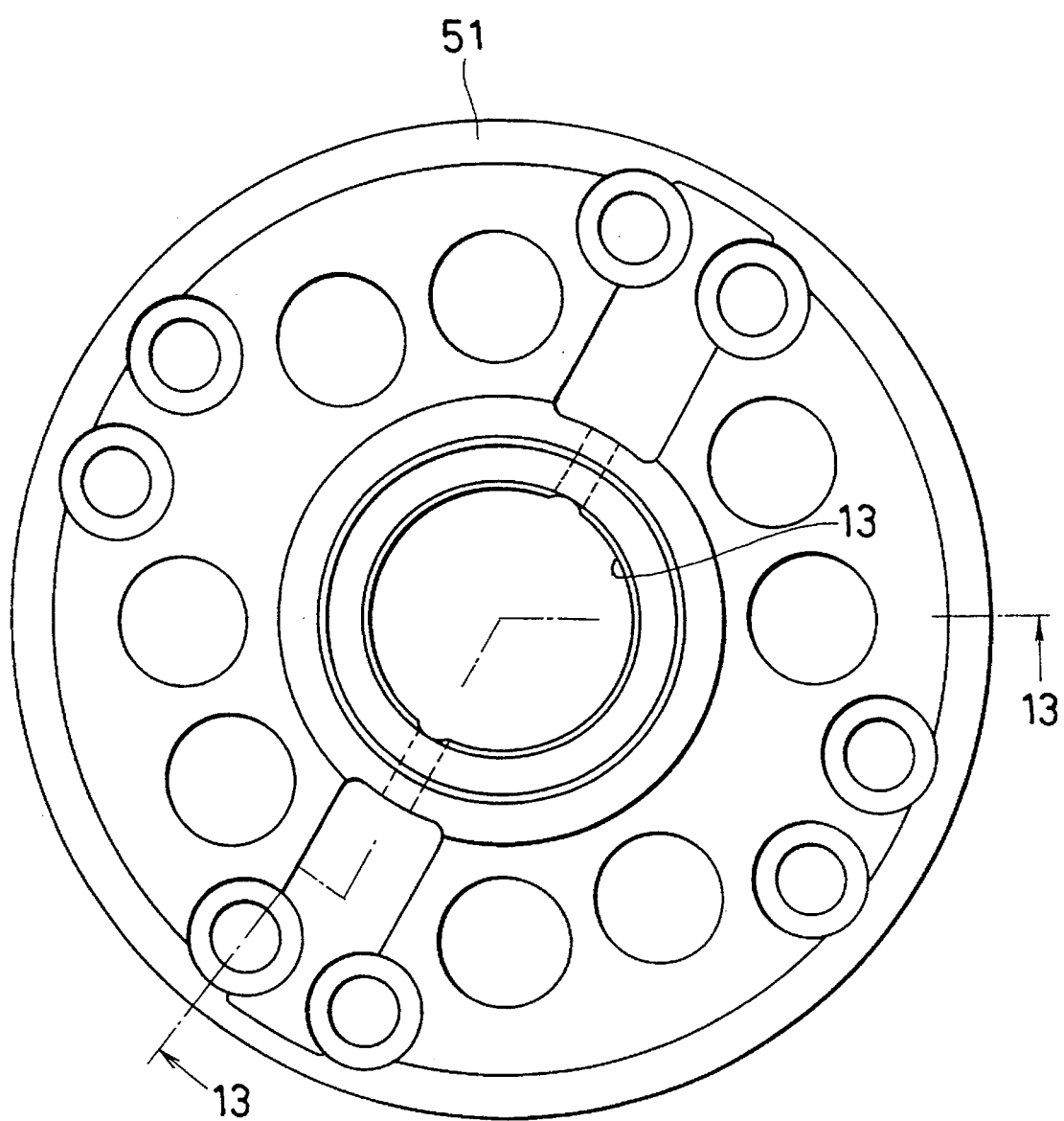
FIG. 15 is a side view of the cover illustrated in FIG. 13 when viewed along a direction J.

FIG. 13 is a sectional view of the cover 51 and corresponds to a sectional view taken along a line 13—13 in FIG. 15. FIG. 14 is a side view of the cover 51 illustrated in FIG. 13 when viewed along a direction I. FIG. 15 is a side view of the cover 51 illustrated in FIG. 13 when viewed along a direction J.

As illustrated in FIGS. 9, 10, and 13, only a support portion 61 is formed and projected on the cover 47 in this embodiment. The support portion 61 has arcuate support surfaces 63 each of which constitutes a part of the round outline of two overlapping cylinders. Accordingly, when mounted on the case body 49, the support surfaces 63 are matched to the walls defining the receptacle hole parts 55b and 57b at one ends of the receptacle holes 55 and 57 to complete the bore surface which surrounds the round outline of the two overlapping cylinders and holds the first and third gear portions 33 and 37. As illustrated in FIGS. 9 and 10, the support surfaces and wall surfaces of the receptacle hole parts 55b and 57b of the receptacle holes 55 and 57 completely surround the outer periphery of the gear portions 33b and 37b of the first and the second pinion gears 30 and 32 in the engaged state, when the cover 51 is assembled on the case body 49. The support portion 61 supports the first gear portion 33b of the first pinion gear 30 and the third gear portion 37b of the second pinion gear 32 outwardly from the center side to thereby restrict the radial displacement of the pinion gears.

The first gear portion 33b of the first pinion gear 30 and the third gear portion 37b of the second pinion gear 32 are engaged with each other within the receptacle hole parts 55b and 57b. The entire outer periphery of the first and the third gear portions 33b and 37b are supported by a combination of the inner surface of the receptacle hole parts 55b and 57b and the support surface 63 of the support portion 61.

As illustrated in FIGS. 1 and 5, the first and the third gear portions 33b and 37b are engaged with each other within the receptacle hole parts formed at the side of the cover 5 in the first and the second embodiments. In the third embodiment, the first and the third gear portions 33b and 37b are engaged within the receptacle hole parts 56b and 57b which are formed on the case body 49 as illustrated in FIGS. 9 and 10.

In the differential gear assembly of the above-mentioned structure, differential rotation of the second side gear 20 is limited and the driving force is transmitted to the first side gear 18 upon occurrence of slipping of one wheel in the manner similar to the first and the second embodiments. Accordingly, the slippage of one wheel is readily recovered. In addition, the assembly can be reduced in size and weight.

In this embodiment, the first and the second pinion gears 30 and 32 are engaged within the receptacle hole parts 55b and 57b formed in the case body 49. Accordingly, engagement between the side gears 18 and 20 and the pinion gears 30 and 32 and engagement between the pinion gears 30 and 32 are mainly established on the case body 49. As a result, torque transmission is carried out through the case body 49. Thus, the load applied to the cover 47 is reduced to thereby improve the durability of the assembly. In addition, proper engagement between the pinion gears 30 and 32 is maintained and the durability and the quietness of the pinion gears 30 and 32 are improved.

As described above, the pinion gears of the differential gear assembly can be properly supported according to the present invention, because the first and the third gear portions engaged with each other are held by the holding member having the inner bore surface covering the entire periphery of the first and the third gear portions for engagement of the pinion gears. In addition, the whole assembly can be reduced in size and weight, while the durability and the quietness of the pinion gears can be improved.

In the first, second and third embodiments described above, the first and the third gear portions 33b, 37b, the flange portion 4 and the boss portion 19b(20b) of the second side gear 19(20) are disposed on the same flat plane which is perpendicular to the rotation axis of the cases 1(47). In other words, the differential assembly is constructed in such a manner that axes of the first and third gear portions 33b, 37b, and center axes of the flange portion 4 and the boss portion 19b(20b) are aligned with one another. In this construction, the support portion 43(61) supports the pinion gears 29(30), 31(32), while it also bears the side gears 19(20). Accordingly, the inside room of the case 1(47) is used with advantage, and the axial length of the case 1(47) is made shorter, with stability of the pinion gears 29(30), 31(32) and the side gears 19(20).

In the first embodiment, the first and second pinion gears 29, 31 are firmly supported at the both ends thereof by the support portions 41, 43. Therefore, the axes of the pinion gears 29, 31 are fixed and stable. In contrast, in each of the second and third embodiments, it is only the support portion 43(61) to firmly support the pinion gears 30, 32 merely. However, axes of the pinion gears 30, 32 of these embodiments are nevertheless stable. This stability is a result of the shorter length of the second pinion gear 32. In detail, the second receptacle hole 23 is also made short, so that the second receptacle hole 23 does not communicate with the receptacle hole part 21c. Accordingly, the receptacle hole part 21c which bears the second gear portion 35 communicates with only the chamber 7. Therefore, the second gear portion 35 is rather firmly supported at the receptacle hole part 21c. As to the second pinion gear 31, the fourth gear portion 39 is not firmly supported in the receptacle hole 23. However, the axial length of the second pinion gear 31 is short, and the third gear portion 37b which is firmly supported at the receptacle hole part 23b occupies about a half portion of the second pinion gear 31, which is rather large. Therefore, the axis of the second pinion gear 31 is also stable.

In the foregoing embodiments, the first and the second pinion gears are arranged so that the wall surfaces defining the first and the second receptacle holes support not only the outer periphery of the first and the third gear portions formed at the opposite ends but also the outer periphery of the second and the fourth gear portions. It will be understood that the present invention is not restricted to the above-mentioned structure. For example, the first embodiment may be modified so that the chamber of the case is formed into a cylindrical shape having a size sufficient to contain the first and the second receptacle holes and that both the cover 5 and the shaft bearing 6 are provided with the support portions projecting therefrom and having the receptacle holes of a shape of two overlapping cylinders. With this structure, the outer periphery of the first and the second pinion gears are supported only by the support portions and the walls defining the receptacle holes on the support portions at the opposite ends.

Although the helical gear is used as the gear portion in the foregoing embodiment, use may be made of a spur gear. It is noted that the helical gear provides a great differential limiting force by the use of a gear thrust force. By adjusting the orientation of the gear teeth, the differential limiting force during the straightforward movement drive can be made greater than that during the straightforward movement with an engine brake operated. It is therefore possible to reduce the interference with ABS (Anti-lock Breaking System). Thus, the helical gear is preferable.

It must be understood that the invention is in no way limited to the above embodiments and that many changes may be brought about therein without departing from the scope of the invention as defined by the appended claims.

What is claimed is:

1. A differential gear assembly comprising:

a case rotatable around a rotation axis in response to a driving force supplied from a power source;

first and second side gears being coaxially supported in said case in such a manner that said first and second side gears are individually rotatable around said rotation axis of the case with respect to said case, said first and second side gears being adapted to be connected to first and second output shafts, respectively;

at least one pair of first and second pinion gears, said first pinion gear having first and second gear portions, said second pinion gear having third and fourth gear portions, the first and second pinion gears being arranged in parallel to said rotation axis so that said first gear portion is engaged with said third gear portion, said second gear portion is engaged with said first side gear, and that said fourth gear portion is engaged with said second side gear; and a holding member being provided on said case for holding said first and second pinion gears in such a manner that the first and second pinion gears move with the case around the rotation axis in response to rotation of the case and each of the first and second pinion gears is slidably rotatable around an axis thereof with respect to the holding member, wherein said first and third gear portions move around the rotation axis within a first cylindrical scope which is located at one of axially outer sides of a second cylindrical scope containing said first and second side gears.

2. The differential gear assembly of claim 1, wherein the first and second side gears are arranged adjacently to each other.

3. The differential gear assembly of claim 2, wherein the second pinion gear is shorter than the first pinion gear so that the second pinion gear does not align with the first side gear.

4. The differential gear assembly of claim 3, wherein the case has a flange portion through which the driving power is transmitted from the power source, and axes of the first and third gear portions and center axis of the flange portion are aligned with one another.

5. The differential gear assembly of claim 3, wherein each of the first and second side gears has a boss portion, and axes of the first and third gear portions and the boss portion of the second side gear are aligned with one another.

6. The differential gear assembly of claim 1, wherein the holding member has a holding bore entirely circumscribing circumferences of said first and third gear portions for preventing axes of the first and second pinion gears from being shifted.

7. An assembly as claimed in claim 1, wherein each of said first, second, third and fourth gear portions is formed at each of ends of said first and said second pinion gears, respectively, and each of said first and second pinion gears has a pair of flat end surfaces at opposite ends thereof.

8. An assembly as claimed in claim 1, wherein said first and said third gear portions are formed at one ends of said first and said second pinion gears, respectively.

9. The differential gear assembly of claim 4, wherein said holding member is integrally formed with said case.

10. The differential gear assembly of claim 6, wherein said holding bore of said holding member is defined by a shape of two combined cylinders parallel to said rotation axis of said case and parallel to each other.

11. The differential gear assembly of claim 4, wherein said case comprises a case body and a cover, and said cover and said case body form separate pieces.

12. The differential gear assembly of claim 11, wherein said case body has a portion covering said first and said second side gears and said first and said second pinion gears along a circumferential direction, and wherein said cover has a portion covering said first and said second side gears and said first and said second pinion gears along a plane intersecting with said rotation axis of said case.

13. The differential gear assembly of claim 11, wherein said holding member comprises a first member integrally formed with said case body and a second member integrally formed with said cover.

14. The differential gear assembly of claim 13, wherein the holding member has a holding bore entirely circumscribing circumferences of said first and third gear portions for preventing axes of the first and second pinion gears from being shifted.

15. The differential gear assembly of claim 14, wherein said first and said second members are coupled into said holding bore when said case body and said cover are assembled together, and said second member has two arcuate support surfaces.

16. The differential gear assembly of claim 4, wherein said holding member supports said first and said second pinion gears in a radial direction of said case.

* * * * *